US011681026B2

(12) United States Patent
Ding et al.

(10) Patent No.: US 11,681,026 B2
(45) Date of Patent: Jun. 20, 2023

(54) ELECTRONIC DEVICE, METHOD AND COMPUTER PROGRAM

(71) Applicant: Sony Semiconductor Solutions Corporation, Kanagawa (JP)

(72) Inventors: Qing Ding, Stuttgart (DE); Alper Ercan, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 737 days.

(21) Appl. No.: 16/508,855

(22) Filed: Jul. 11, 2019

(65) Prior Publication Data
US 2020/0018833 A1 Jan. 16, 2020

(30) Foreign Application Priority Data

Jul. 11, 2018 (EP) .................................... 18182863

(51) Int. Cl.
*H04N 25/71* (2023.01)
*G01S 7/4865* (2020.01)
(52) U.S. Cl.
CPC ......... *G01S 7/4865* (2013.01); *H04N 25/745* (2023.01)
(58) Field of Classification Search
CPC .................................................. H04N 5/3765
See application file for complete search history.

(56) References Cited

U.S. PATENT DOCUMENTS

| 9,000,837 | B1* | 4/2015 | Fifield | G11C 29/021 |
| | | | | 327/306 |
| 2002/0054390 | A1* | 5/2002 | Koizumi | H04N 5/378 |
| | | | | 348/E3.018 |
| 2005/0007325 | A1* | 1/2005 | Kim | G09G 3/3688 |
| | | | | 345/87 |
| 2011/0299059 | A1 | 12/2011 | Buettgen et al. | |
| 2012/0248290 | A1* | 10/2012 | Kamiyama | H01L 27/14812 |
| | | | | 250/206 |
| 2012/0307229 | A1* | 12/2012 | Conroy | H04N 5/3765 |
| | | | | 356/5.1 |
| 2017/0040362 | A1* | 2/2017 | Na | H01L 31/1812 |

FOREIGN PATENT DOCUMENTS

CN 107613877 A 1/2018

OTHER PUBLICATIONS

Bamji et al., A 0.13μm CMOS System-on-Chip for a 512x424 Time-of-Flight Image Sensor With Multi-Frequency Photo-Demodulation up to 130 MHz and 2 GS/s ADC. IEEE Journal of Solid-State Circuits. 2015:50(1):303-319.
Conroy et al., A Power-Saving Modulation Technique for Time-of-Flight Range Imaging Sensors. Proc. of SPIE. 2011;8085. 13 pages.

* cited by examiner

*Primary Examiner* — Thanh Luu
(74) *Attorney, Agent, or Firm* — Wolf, Greenfield & Sacks, P.C.

(57) ABSTRACT

An electronic device comprising circuitry configured to drive a unit pixel for a time of flight camera according to a multi-level mixing clock scheme.

15 Claims, 9 Drawing Sheets

ELECTRONIC DEVICE, METHOD AND COMPUTER PROGRAM

CROSS REFERENCE TO RELATED APPLICATIONS

The present application claims priority to European Patent Application 18182863.3 filed by the European Patent Office on Jul. 11, 2018, the entire contents of which being incorporated herein by reference.

TECHNICAL FIELD

The present disclosure generally pertains to the field of electronic devices, in particular imaging devices and methods for imaging devices.

TECHNICAL BACKGROUND

A time-of-flight camera is a range imaging camera system that determines the distance of objects measuring the time-of-flight (ToF) of a light signal between the camera and the object for each point of the image. A time-of-flight camera thus receives a depth map of a scene. Generally, a time-of-flight camera has an illumination unit that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

A typical ToF camera pixel develops a charge that represents a correlation between the illuminated light and the backscattered light. To enable the correlation between the illuminated light and the backscattered light, each pixel is controlled by a common modulation input coming from one or more mixing drivers. The modulation input to the pixels is synchronous with an illumination block modulation.

The load of the mixing drivers is typically capacitive. The power consumed is described by the well-known equation $CV^2f$, where C is the total load capacitance, V is the supply voltage and f is the switching speed of the mixing drivers (or modulation frequency). The mixing drivers consume a lot of power especially when the load capacitance is large or the modulation frequency is high.

Conventionally the power consumption is reduced by reducing the load capacitance, especially by reducing the photo-gate/transfer-gate capacitance.

SUMMARY

According to a first aspect, the disclosure provides an electronic device comprising circuitry configured to drive a unit pixel for a time of flight camera according to a multi-level mixing clock scheme.

According to a second aspect, the disclosure provides a method, comprising driving a unit pixel for a time of flight camera according to a multi-level mixing clock scheme.

According to a third aspect, the disclosure provides a time-of-flight system comprising the circuitry of the first aspect, a light source and an image sensor.

According to a fourth aspect, the disclosure provides a computer program, comprising instructions, the instructions when executed on a processor controlling a driver of a unit pixel for a time of flight camera according to a multi-level mixing clock scheme.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 3:
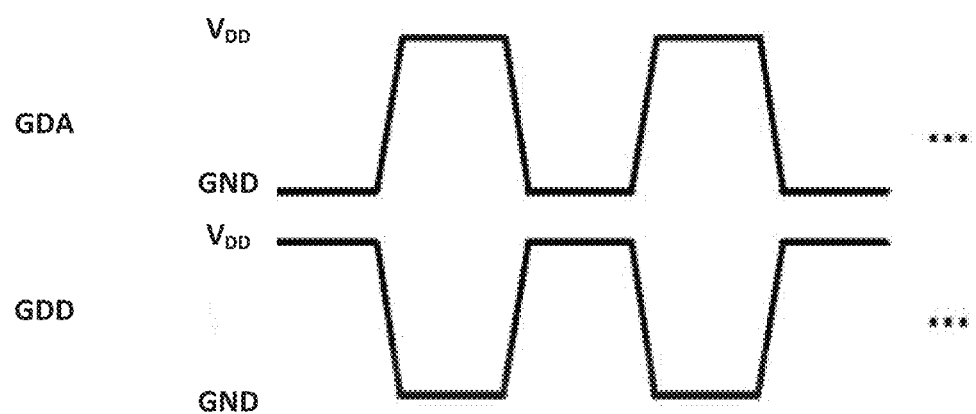
FIG. 3 shows modulation signals that are supplied to the inputs of the mixing driver of FIG. 2.

Before a detailed description of a first embodiment of the present disclosure under reference of FIG. 3 is given, general explanations are made.

As mentioned in the outset, time-of-flight (ToF) cameras are known to include a variety of methods that measure the time that light needs for travelling a distance in a medium, such that the distance can be determined. In indirect time-of-flight (iToF) cameras calculate a phase shift between illuminated light and backscattered light for obtaining depth measurements by sampling a correlation wave, e.g. between a modulation signal for driving a light source, pixel arrays, or the like, with a signal obtained based on backscattered light.

The embodiments described below provide an electronic device comprising circuitry configured to drive a unit pixel for a time of flight camera according to a multi-level mixing clock scheme.

The electronic device may for example be an image sensor, e.g. an image sensor of an in direct time of flight camera (ToF). An indirect time of flight camera may resolve distance by measuring a phase shift of an emitted light and a back scattered light.

Circuitry may include any electronic elements, semiconductor elements, switches, amplifiers, transistors, processing elements, and the like.

The circuitry may in particular be a driver for ToF unit pixels which provides a modulated signal to the signal inputs of one or more unit pixels. Driving a unit pixel of a time of flight camera with multi-level mixing clock signals may for example comprise using the multi-level mixing clock signals as modulation signals for the unit pixel. A modulation signal may be a signal which is correlated to the signal collected in the unit pixel.

A time-of-flight camera may be a range imaging camera system that determines the distance of objects measuring the time-of-flight (ToF) of a light signal between the camera and the object for each point of the image.

The unit pixels of a ToF camera typically comprise one or more photosensitive elements (e.g. photo diodes). A photosensitive element converts the incoming light into a current. Switches (e.g. transfer gates) that are connected to the photo diode may direct the current to one or more memory elements (e.g. capacitors) that act as accumulation elements that accumulate and/or store charge. The unit pixels may be lock-in pixels, e.g. a FDGS type pixels or Photonic Mixer Devices (PMD), for the time of flight camera. All unit pixels in the ToF sensor may be controlled by the modulation signal which is based on the multi-level mixing clock signal.

The multi-level mixing clock scheme may be used to generate one or more (effective) modulation signals that drive the unit pixels. These (effective) modulation signals may be step functions that comprises multiple voltage levels.

In some embodiments, the unit pixel comprises a first trace and a second trace and wherein the multi-level mixing scheme comprises supplying an effective first trace modulation signal to the first trace of the unit pixel and supplying an effective second trace modulation signal to the second trace of the unit pixel.

For example, the first trace and the second trace may comprise respective storage capacitors of a unit pixel that are charged and discharged by the effective modulation signal.

Typically, the effective first trace modulation signal and the effective second trace modulation signal are 180° phase shifted.

The effective modulation signals may for example have a frequency in the range of 10 to 100 MHz.

In some embodiments, the multi-level mixing clock scheme is an N-level mixing clock scheme, wherein the effective modulation signals have N+1 voltage levels, where N is an integer number greater than 1.

The effective modulation signals may for example be signals that oscillate between a high state $V_{DD}$ and a low state GND with N+1 voltage levels, where N is an integer number greater than 1, where a voltage step is a voltage transition from a voltage level to another voltage level.

The effective modulation signal may be a periodic signal, wherein a period comprises a charging phase and a discharging phase, where each of the phases includes N voltage steps.

In some embodiments, in the N-level mixing clock scheme the N+1 voltage levels of the effective modulation signals define N voltage steps.

In some embodiments, the multi-level mixing clock scheme is a two-level mixing clock scheme, wherein the effective modulation signals provides three voltage levels.

The effective modulation signals may for example be signals that oscillate between GND and $V_{DD}$ with an intermediate voltage level $V_{DD}/2$. In this embodiment with three voltage-levels (GND, $V_{DD}/2$, $V_{DD}$), there are two voltage steps, namely GND to $V_{DD}/2$, and $V_{DD}/2$ to $V_{DD}$. The effective modulation signal of three voltage-levels according to this embodiment may be a periodic signal, wherein a period comprises a charging phase and a discharging phase, where each of the phases include two voltage steps.

In some embodiments, the multi-level mixing scheme is an active multi-level mixing scheme.

An active multi-level mixing scheme may comprise the providing of several predefined voltage levels and the generating of an effective modulation signal from these predefined voltage levels.

In some embodiments, the active multi-level mixing scheme comprises the generating of an effective first trace modulation signal and an effective second trace modulation signal from predefined voltage levels.

In some embodiments, the circuitry comprises switches which are driven according to the multi-level mixing scheme to generate the effective first trace modulation signal and the effective second trace modulation signal.

In some embodiments, the voltage levels are provided by analog buffers to the unit pixel.

The analog buffers may deliver a voltage of the multi-level mixing scheme to the unit pixels.

In some embodiments, the multi-level mixing scheme is a passive multi-level mixing scheme.

In some embodiments, the passive multi-level mixing scheme comprises passively redistributing charge between a first trace and a second trace of the unit pixel to generate the effective first trace modulation signal and the effective second trace modulation signal.

For example, the passive multi-level mixing scheme may comprise passively redistributing charge between one or more first storage capacitors of a first trace and one or more second storage capacitors of a second trace of the unit pixel to generate the effective first trace modulation signal and the effective second trace modulation signal.

In some embodiments, the circuitry comprises a switch that is configured to connect a first trace of the unit pixel with a second trace of the unit pixel for passively redistributing charge between the first trace and the second trace of the unit pixel.

For example, the circuitry may comprise a switch that is configured to connect one or more first capacitors of a first trace of the unit pixel with one or more second capacitors of a second trace of the unit pixel for passively redistributing charge between the first trace and the second trace of the unit pixel.

By controlling the switch, the circuitry may control and manage the timing between the multi-level mixing signal and the voltage/current (effective modulation signal) as seen by the unit pixels.

In some embodiments, the circuitry comprises a first digital buffer for driving a first trace of the unit pixel and a second digital buffer for driving a second trace of the unit pixel, and wherein to the first buffer a first trace modulation signal is supplied and wherein to the second buffer a second trace modulation signal is supplied.

For example, the first trace modulation signal and the second trace modulation signal are phase shifted by 180°. Although more complex arrangements may be used, the modulation signals may be a square wave with a frequency range of 10 to 100 MHz.

In some embodiments, the first digital buffer and the second digital buffer are enabled/disabled according to the multi-level mixing scheme to generate the effective first trace modulation signal and the effective second trace modulation signal.

The digital buffers may be tri-state buffers, i.e. an input controlled switch which comprises an input, an output and a control input. The output may be electronically turned "ON" or "OFF" by means of an external enable/disable control input. This control signal input may be either a logic "0" or a logic "1".

The embodiments also disclose a time-of-flight system comprising the circuitry according to the embodiments, a light source and an image sensor.

The embodiments also disclose a method, comprising driving a unit pixel for a time of flight camera according to a multi-level mixing clock scheme.

The embodiments also disclose a computer program, comprising instructions, the instructions when executed on a processor controlling a driver of a unit pixel for a time of flight camera according to a multi-level mixing clock scheme.

Figure 1:
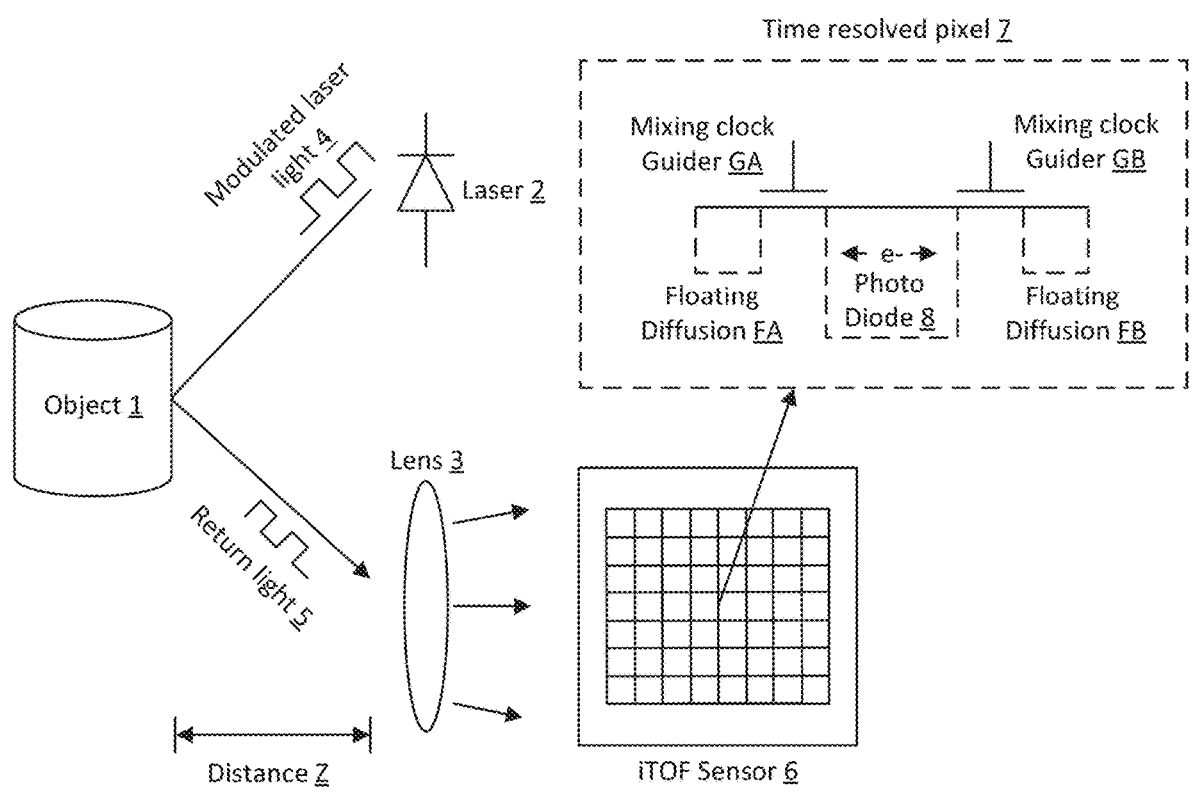
FIG. 1 illustrates schematically the basic operational principle of an indirect time-of-flight (iToF)

FIG. 1 illustrates schematically the basic operational principle of an indirect time-of-flight (iToF) camera. The iToF camera includes an illumination unit (laser) 2, a lens 3 and an iToF sensor 6. The iToF sensor 6 includes a time resolved pixel 7 array. The time resolved pixel 7 includes two floating diffusions FA, FB, two mixing clock guiders GA, GB and a photo diode 8. The mixing clock guiders GA, GB are controlled by a synchronized clock with a modulation clock in the illumination unit (laser) 2. The photo diode 8 generates electrons based on incident photons. The generated electrons are guided to the floating diffusion FA or to the floating diffusion FB, since complementary clocks are applied to the two mixing clock guiders GA and GB.

An object 1 is actively illuminated with a modulated light 4 at a predetermined wavelength using the dedicated illumination unit 2, for instance with some light pulses of at least one predetermined frequency generated by a timing generator (not shown in FIG. 1). The modulated light 4 is returned from the object 1. A lens 3 collects the returning light 5 and forms an image of the objects onto the iToF sensor 4 of the camera. Depending on the distance Z of objects from the camera, a delay is experienced between the emission of the modulated light 4, e.g. the so-called light pulses, and the reception at the camera of those returned light pulses 5.

Indirect time-of-flight (iToF) cameras calculate a delay between modulated light 4 and returned light 5 for obtaining depth measurements by sampling a correlation wave, e.g. between a demodulation signal generated by the timing generator and the reflected light 5 that is stored in a time resolved pixel 7.

Figure 2:
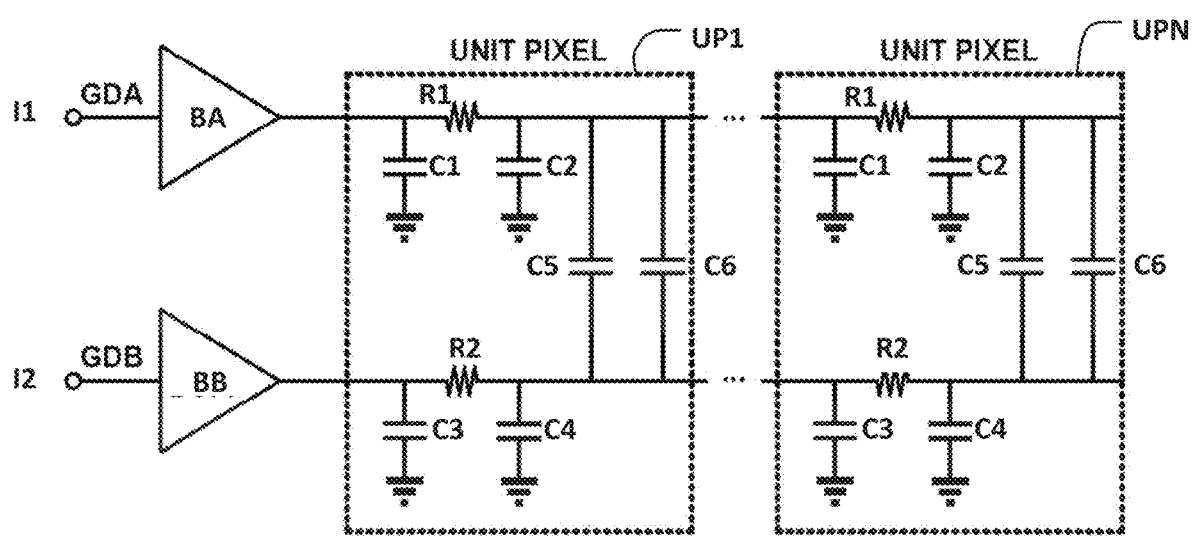
FIG. 2 shows a circuitry of a conventional mixing driver of a ToF camera with a one column pixel array.

FIG. 2 shows, as an example, a circuitry of a conventional mixing driver of a ToF camera with a one column pixel array. The mixing driver has two inputs I1, I2, two buffers BA, BB and several unit pixels UP1, . . . , UPN. Each unit pixel has storage capacitances C1, C2, C3, C4 and integration capacitances C5, C6. The storage capacitances C1, C2, C3, C4 and integration capacitances C5, C6 build together a load capacitance that is periodically charged and discharged. Resistors R1, R2 are placed between storage capacitances C1, C2, and, respectively, C3, C4. Modulation signals GDA, GDB are supplied to the input I1 and the input I2. The supplied modulation signals GDA, GDB are delivered to the unit pixels UP1, . . . , UPN by buffers BA, BB. The input of buffer BA is connected to the first input I1 and the output of buffer BA is connected to the upper trace of the unit pixel P1. The input of buffer BB is connected to the second input I2 and the output of buffer BB is connected to the lower trace of the unit pixel P1. The buffers BA, BB are used to isolate the input I1, I2 from the output.

FIG. 3 shows the modulation signals GDA, GDB that are supplied to the inputs I1, I2 of the mixing driver of FIG. 2. The voltages of the modulation signals GDA, GDB change from ground GND to $V_{DD}$ periodically, and the two modulation signals GDA, GDB have a phase shift of 180 degree. Frequencies used for the modulation signals may be in the range of 10-100 MHz.

A total average power consumption of the mixing driver of FIG. 2 during the charging and discharging of the load capacitance may be calculated using the equation:

$$P = C_{total} \times V_{DD}^2 \times f,$$

where $C_{total}$ is the total load capacitance, $V_{DD}$ is the supply voltage and f is the switching speed of the mixing drivers (or modulation frequency).

Active Multi-Level Mixing

Figure 4:
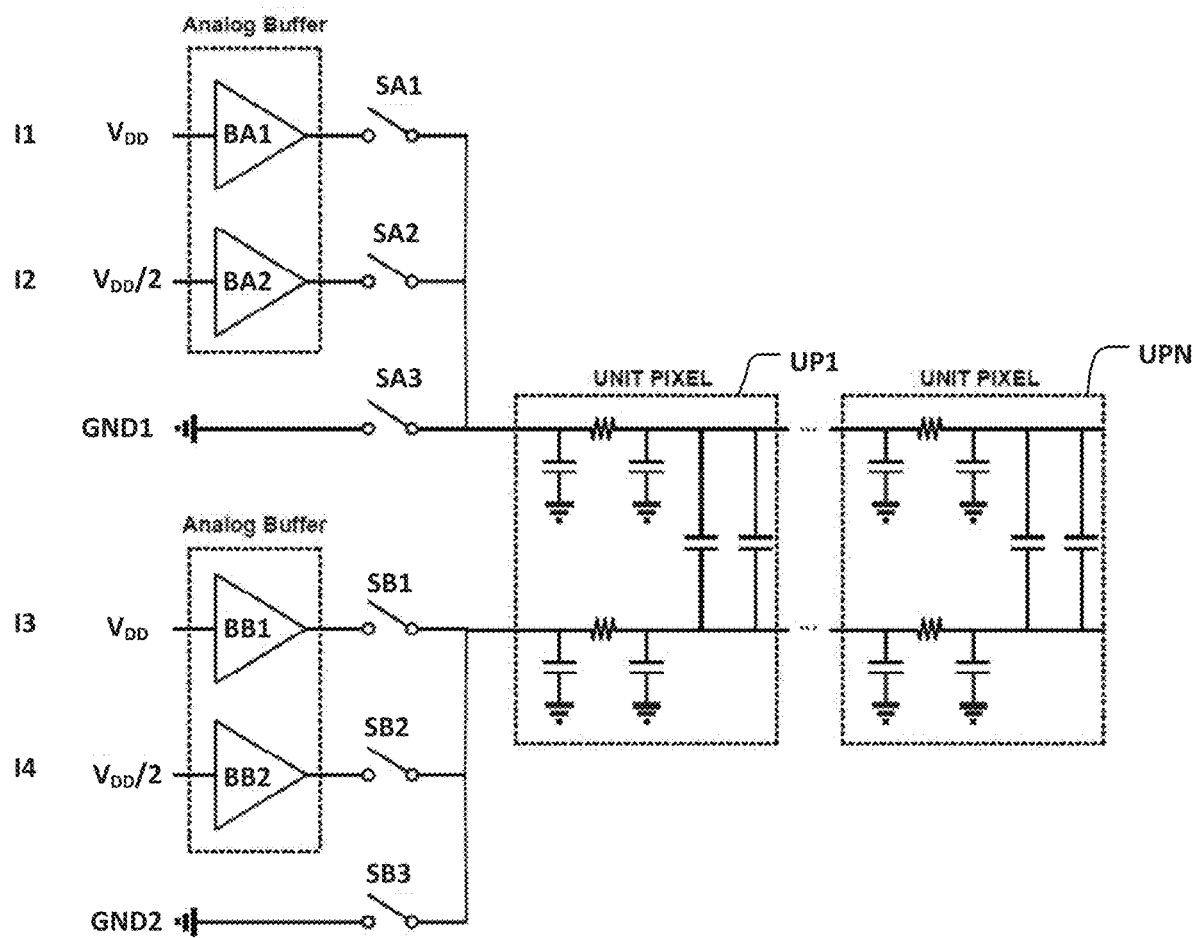
FIG. 4 shows a first embodiment of a circuitry of a mixing driver of a ToF camera with an active two-level mixing clock scheme.

FIG. 4 shows, as an example, a first embodiment of a circuitry of a mixing driver of a ToF camera with an active two-level mixing clock scheme. The mixing driver has four inputs I1, I2, I3, I4, four analog buffers BA1, BA2, BB1, BB2, two grounds GND1, GND2, six switches SA1, SA2, SA3, SB1, SB2, SB3 and N unit pixels UP1, . . . , UPN. The unit pixels UP1, . . . , UPN have an identical structure as shown in FIG. 2.

The first input I1 supplies an input voltage of $V_{DD}$, the second input I2 supplies an input voltage of $V_{DD}/2$, the third input I3 supplies an input voltage of $V_{DD}$ and the fourth input I4 supplies an input voltage of $V_{DD}/2$.

The mixing driver has an upper trace and a lower trace. The upper trace comprises the first input I1, the second input I2 and the first ground GND1 that are connected to several unit pixels UP1, . . . , UPN through the analog buffers BA1, BA2. Further, the first input I1, the second input I2 and the first ground GND1 are connected with switch SA1, switch SA2 and switch SA3, respectively.

The lower trace has a similar configuration as the upper trace, where the lower trace comprises the third input I3, the fourth input I4 and the second ground GND2 that are connected to several unit pixels UP1, . . . , UPN through the analog buffers BB1, BB2. Further, the third input I3, the fourth input I4 and the second ground GND2 are connected with switch SB1, switch SB2 and switch SB3, respectively.

By turning on/off the switches SA1, SA2, SA3, SB1, SB2, SB3 the respective voltages of the respective inputs are applied to the upper trace, and, respectively, the lower trace of unit pixels UP1, . . . , UPN.

Figure 5:
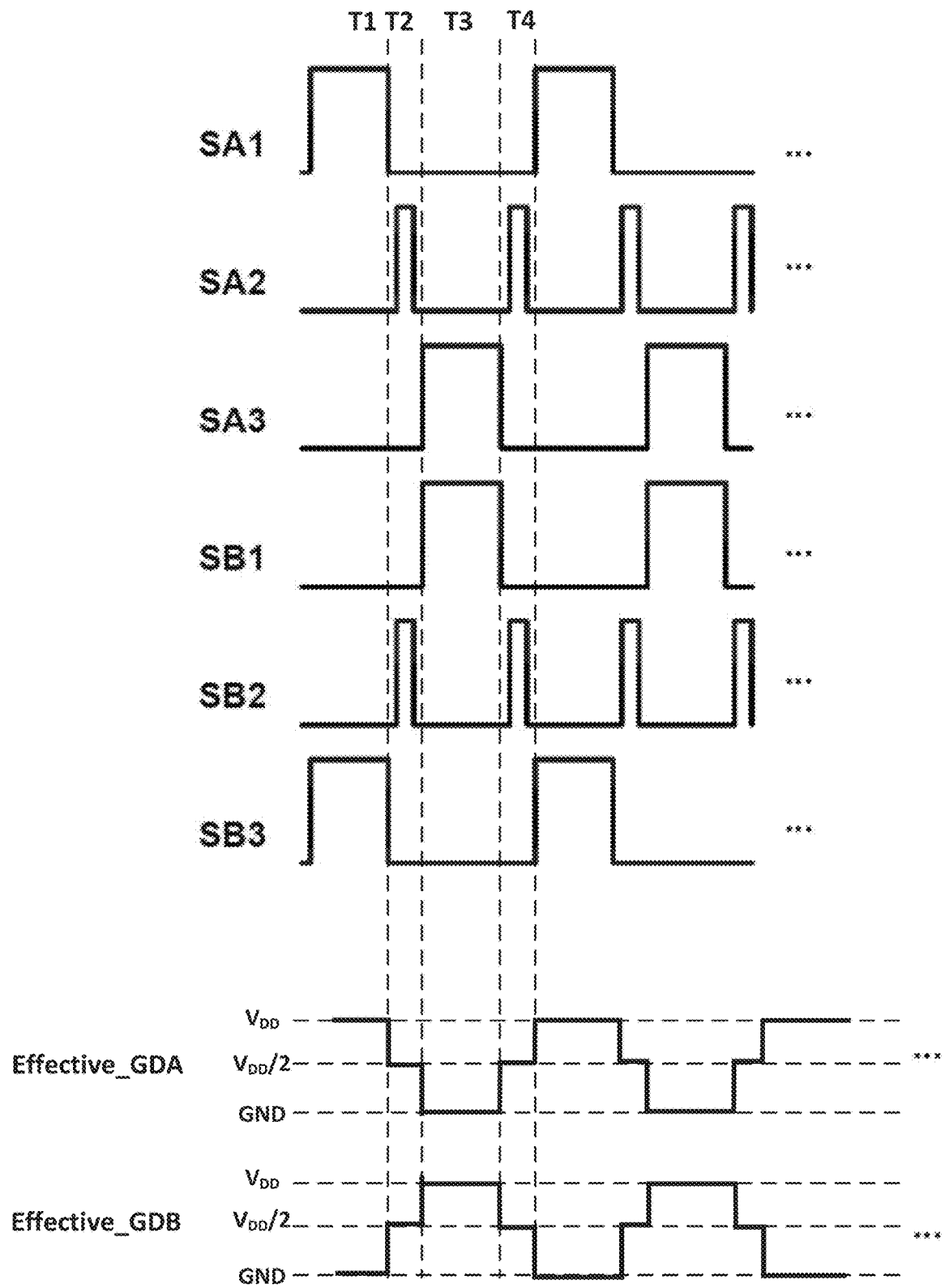
FIG. 5 shows a multi-level clock scheme for driving six switches of the mixing driver of FIG. 4, as well as effective modulation signal waveforms in the time domain.

FIG. 5 shows, as an example, a multi-level clock scheme for driving the six switches SA1, SA2, SA3, SB1, SB2, SB3, as well as the effective modulation signal waveform Effective_GDA of the upper trace on pixel, and the effective modulation signal waveform Effective_GDB of the lower trace on pixel in time domain resulting from this multi-level clock scheme.

In a first phase T1, switch SA1 and switch SB3 are turned on and switches SA2, SA3, SB1, SB2 are turned off. The effective modulation signal Effective_GDA of the upper trace thus is $V_{DD}$ and the effective modulation signal Effective_GDB of the lower trace is GND. Therefore, a voltage with an amplitude of $V_{DD}$ is applied to the pixel array by the upper trace and GND is applied to the to the pixel array by the lower trace. In a second phase T2, switch SA2 and switch SB2 are turned on and switches SA1, SA3, SB1, SB3 are turned off. The effective modulation signal Effective_GDA of the upper trace thus is $V_{DD}/2$ and the effective modulation signal Effective_GDB of the lower trace is $V_{DD}/2$. In a third phase T3, switch SA3 and switch SB1 are turned on and switches SA1, SA2, SB2, SB3 are turned off. The effective modulation signal Effective_GDA of the upper trace thus is GND and the effective modulation signal Effective_GDB of the lower trace is $V_{DD}$. In a fourth phase T4, switch SA2 and switch SB2 are turned on and switches SA1, SA3, SB1, SB3 are turned off. The effective modulation signal Effective_GDA of the upper trace thus is $V_{DD}/2$ and the effective modulation signal Effective_GDB of the lower trace is $V_{DD}/2$.

The phases T1 to T4 are repeated so that the resulting effective modulation signal of the upper trace/lower trace results is a two-step function as shown in FIG. 5.

Taking the upper trace as an example, when it is charged, instead of being charged from GND to $V_{DD}$ directly, it is first charged from GND to $V_{DD}/2$ and then from $V_{DD}/2$ to $V_{DD}$.

In the step from the third phase T3 to the fourth phase T4 (charging phase), i.e. from GND to $V_{DD}/2$ (effective upper trace modulation signal), the power consumption is $$P1 = 0.5 \times V_{DD} \times C_L \times 0.5 \times V_{DD} \times f = 0.25 \times C_{total} \times V_{DD}^2 \times f$$

In the step from the fourth phase T4 to the first phase T1 (charging phase), i.e. from $V_{DD}/2$ to $V_{DD}$, the power consumption is $$P2 = V_{DD} \times C_L \times 0.5 \times V_{DD} \times f = 0.5 \times C_L \times V_{DD}^2 \times f$$

Therefore, the total average power consumption is $$P_{total} = P1 + P2 = 0.75 \times C_L \times V_{DD}^2 \times f$$

Compared to the total average power consumption of the conventional method that is shown in FIG. 2 the total average power consumption saved by the first embodiment is:

$$P_{save} = 0.25 \times C_{total} \times V_{DD}^2 \times f$$

That 25% power is saved compared to the conventional method.

Figure 6:
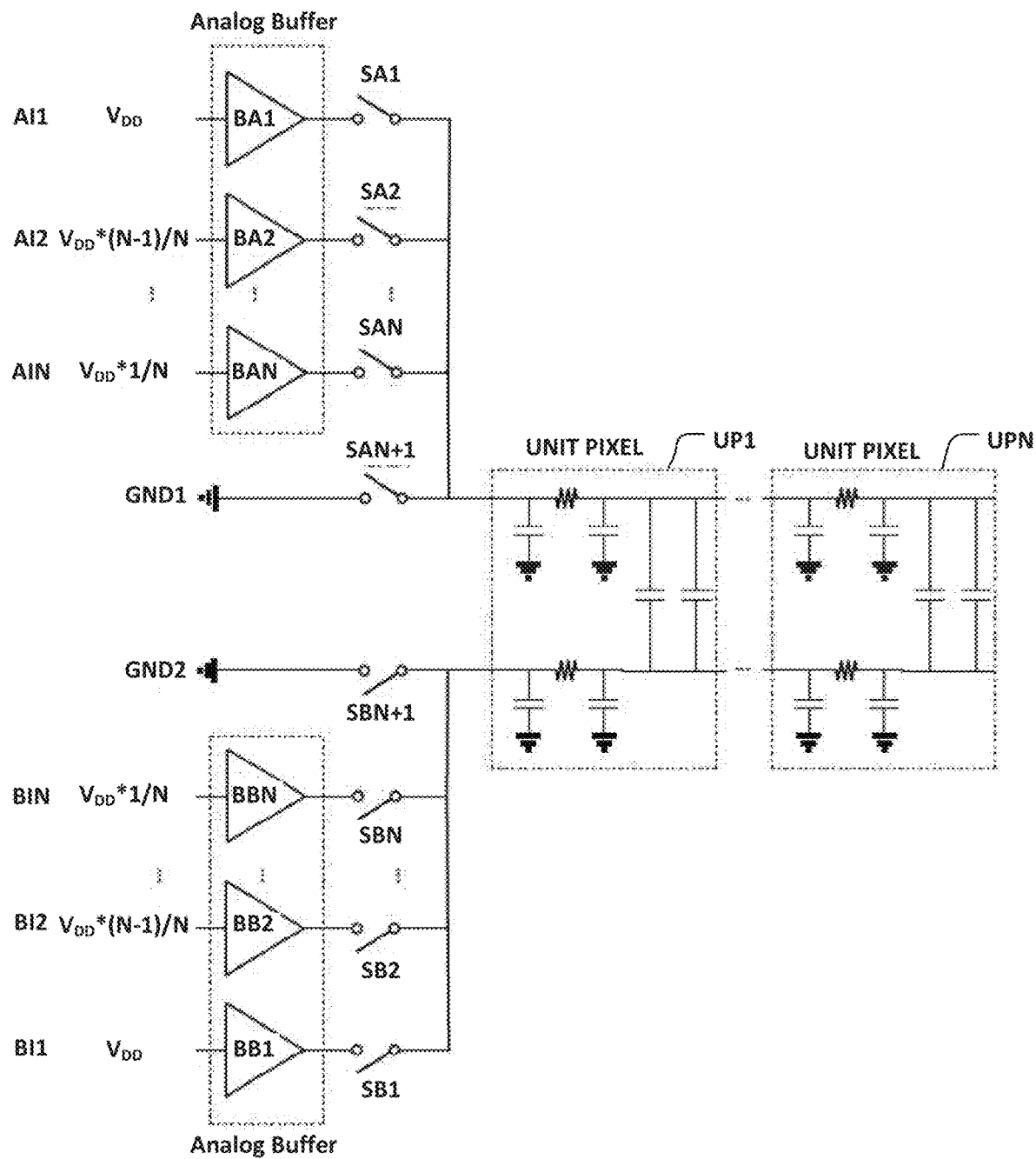
FIG. 6 shows a second embodiment of a circuitry of a mixing driver for a ToF camera with an active N-level mixing clock scheme.

FIG. 6 shows, as an example, a second embodiment of a circuitry of a mixing driver for a ToF camera with an active N-level mixing clock scheme. The mixing driver has 2N inputs AI1, . . . , AIN and BI1, . . . , BIN, 2N analog Buffers BA1, . . . , BAN and BB1, . . . , BBN, two grounds GND1, GND2, 2(N+1) switches SA1, . . . , SAN+1 and SB1, . . . , SBN+1 and several unit pixels UP1, . . . , UPN.

The mixing driver 2 has an upper trace and a lower trace. The upper trace comprises N inputs AI1, . . . , AIN and the first ground GND1 that are connected to several unit pixels UP1, . . . , UPN through the analog buffers BA1, . . . , BAN. Further, the N inputs AI1, . . . , AIN and the first ground GND1 are connected with the N+1 switches SA1, . . . , SAN+1. By turning on/off the switches SA1, . . . , SAN+1 of the respective inputs AI1, . . . , AIN the respective voltage of the inputs AI1, . . . , AIN is applied to the unit pixels UP1, . . . , UPN. The first input voltage AI1 of the upper trace has an amplitude of $V_{DD}$, the second input voltage AI2 of the upper trace has an amplitude of $V_{DD}/2$, . . . , the N−1 input voltage AIN−1 of the upper trace has an amplitude of $V_{DD} \times (N-1)/N$ and the N input voltage AIN of the upper trace has an amplitude of $V_{DD} \times 1/N$.

The lower trace has a similar configuration as the upper trace, where the lower trace comprises N inputs BI1, . . . , BIN and the second ground GND2 that are connected to several unit pixels UP1, . . . , UPN through the analog buffers BB1, . . . , BBN. Further, the N inputs BI1, . . . , BIN and the second ground GND1 are connected with the N+1 switches SB1, . . . , SBN+1. By turning on/off the switches SB1, . . . , SBN+1 of the respective inputs BI1, . . . , BIN the respective voltage of the inputs BI1, . . . , BIN is applied to the unit pixels UP1, . . . , UPN. The first input voltage BI1 of the lower trace has an amplitude of $V_{DD}$, the second input voltage BI2 of the lower trace has an amplitude of $V_{DD}/2$, . . . , the N−1 input voltage BIN−1 of the lower trace has an amplitude of $V_{DD} \times (N-1)/N$ and the N input voltage BIN of the lower trace has an amplitude of $V_{DD} \times 1/N$.

Figure 7:
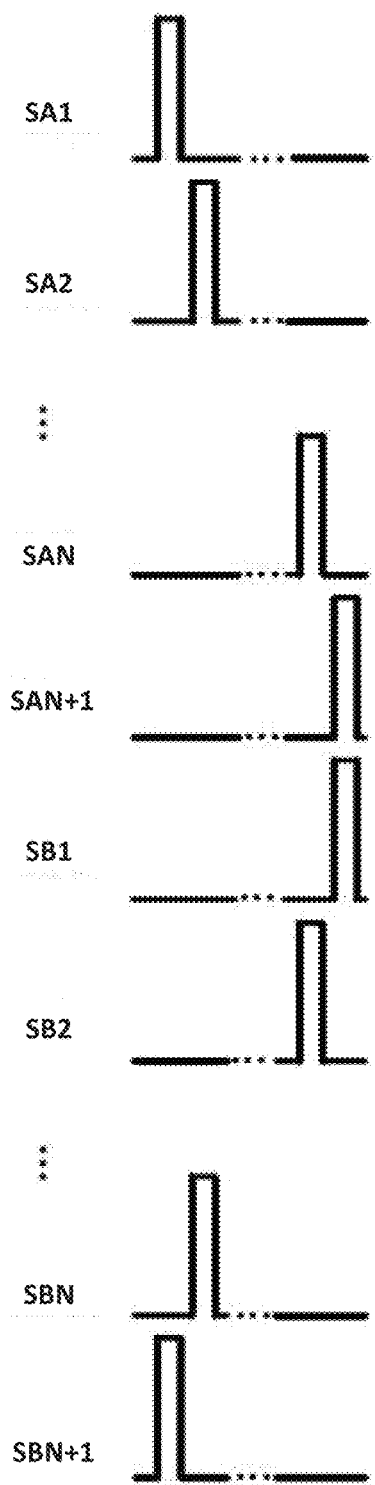
FIG. 7 shows a multi-level clock scheme for driving the switches of the mixing driver of FIG. 6.

FIG. 7 shows, as an example, a multi-level clock scheme for driving the 2(N+1) switches SA1, . . . , SAN+1 and SB1, . . . , SBN+1 of FIG. 6. The effective modulation signal waveform Effective_GDA of the upper trace on the pixel, and the effective modulation signal waveform Effective_GDB of the lower trace on the pixel in time domain are not shown in FIG. 7, however, the effective modulation signal waveform Effective_GDA, Effective_GDB have a similar shape as in FIG. 5.

In a first phase T1, switch SA1 and switch SBN+1 are turned on and the remaining switches are turned off. The effective modulation signal of the upper trace thus is $V_{DD}$ and the effective modulation signal of the lower trace is GND. In a second phase T2, switch SA2 and switch SBN are turned on and the remaining switches are turned off. The effective modulation signal of the upper trace thus is $V_{DD} \times (N-1)/N$ and the effective modulation signal of the lower trace is $V_{DD} \times 1/N$. This scheme is repeated until in a phase TN, switch SAN and switch SB2 are turned on and the remaining switches are turned off. The effective modulation signal of the upper trace thus is $V_{DD} \times 1/N$ and the effective modulation signal of the lower trace is $V_{DD} \times (N-1)/N$. In a final phase TN+1, switch SAN+1 and switch SB1 are turned on and the remaining switches are turned off. The effective modulation signal of the upper trace thus is GND and the effective modulation signal of the lower trace is $V_{DD}$.

The phases T1 to TN+1 are repeated so that the resulting effective modulation signal of the upper trace/lower trace results is a N-step function (not shown in FIG. 7), where the upper trace and the lower trace has a 180 degree phase difference.

With a similar calculation as in FIGS. 3 and 4 the total average power consumption of the mixing driver with an active N-level mixing clock scheme is $$P_{save} = (N-1)/2N \times C_{total} \times V_{DD}^2 \times f$$

That is, compared to the total average power consumption of the conventional method that is shown in FIG. 2, (N−1)/2N % of the power is saved.

Passive Multi-Level Mixing

Figure 8:
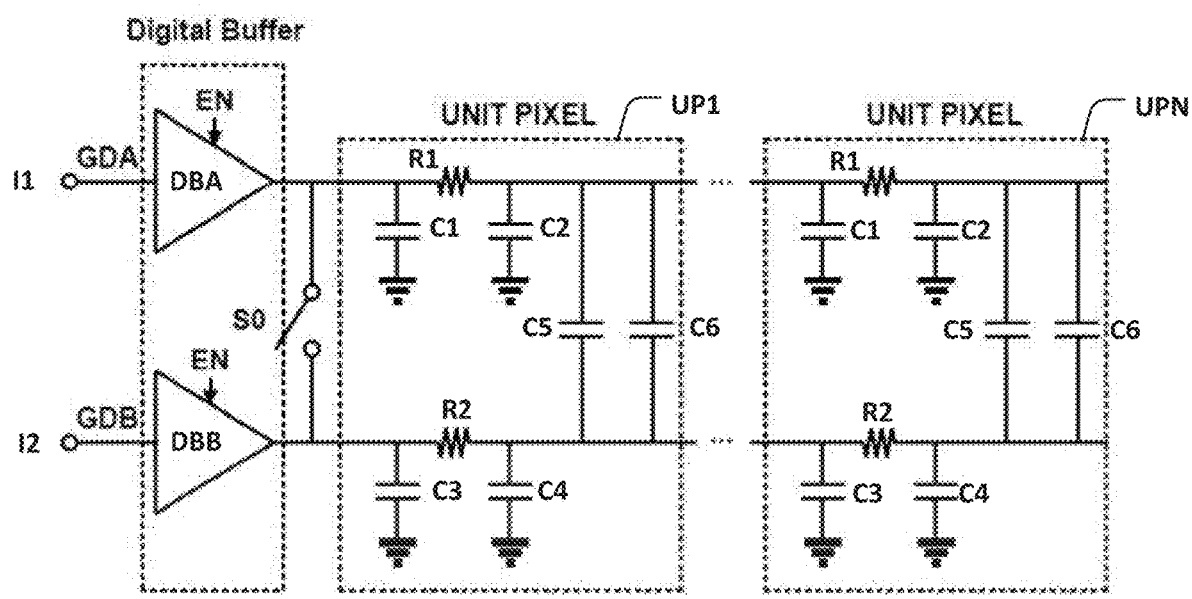
FIG. 8 shows a third embodiment of a circuitry of a mixing driver of a ToF camera with a passive two-level mixing clock scheme.

FIG. 8 shows, as an example, a third embodiment of a circuitry of a mixing driver of a ToF camera with a passive two-level mixing clock scheme. The mixing driver has two inputs I1, I2, two digital buffers DBA, DBB, a switch S0 and several unit pixels UP1, . . . , UPN.

The digital buffers DBA, DBB comprise an input, an output and a control input. The digital buffers DBA, DBB are turned on or off by the control input. When the digital buffers DBA, DBB are turned on (enable) the input signal is delivered to the output, and when the digital buffers DBA, DBB are turned off (disable) the input signal is not delivered to the output.

The mixing driver has an upper trace and a lower trace. The upper trace comprises the first input I1 to which a first modulation signal GDA is supplied. The first input I1 is connected to several unit pixels UP1, . . . , UPN through the first digital buffer DBA.

The lower trace has a similar configuration as the upper trace, where the lower trace comprises the second input I2 to which a second modulation signal GDB is supplied. The second input I2 is connected to several unit pixels UP1, . . . , UPN through the second passive buffer DBB.

The switch S0 is located in front of the several unit pixels UP1, . . . , UPN, and connects the upper trace and the lower trace.

Each unit pixel has storage capacitances C1, C2, C3, C4 and integration capacitance C5, C6. The storage capacitances C1, C2, C3, C4 and integration capacitance C5, C6 builds a load capacitance that is periodically charged and discharged from ground to supply power $V_{DD}$ that is introduced by the passive buffers DBA, DBB. Resistors R1, R2 are placed between storage capacitances C1, C2, and, respectively, C3, C4.

Figure 9:
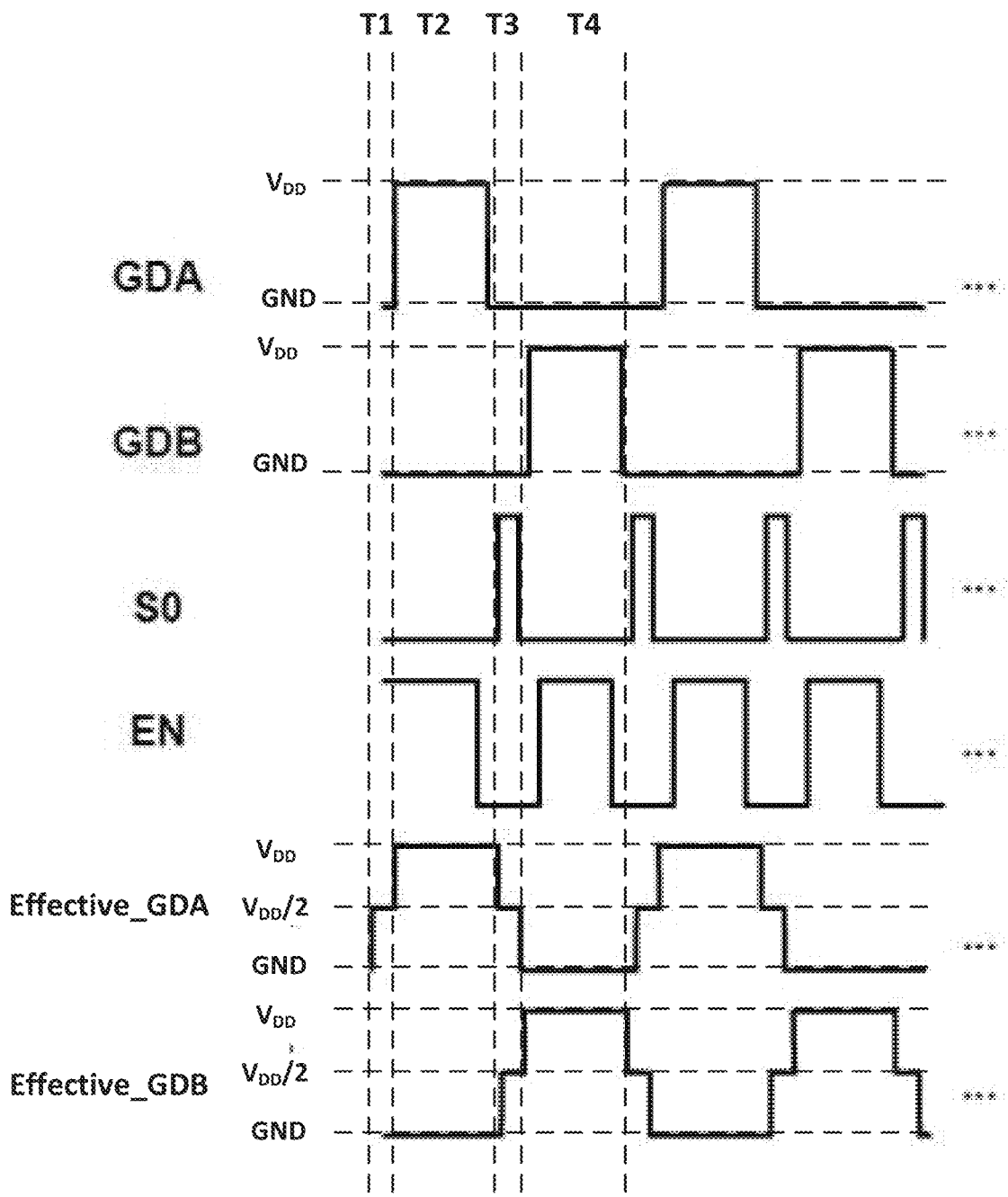
FIG. 9 shows a multi-level clock scheme for controlling a switch and digital buffers of the mixing driver of FIG. 8, as well as the effective modulation signal clock waveforms in time domain.

FIG. 9 shows a multi-level clock scheme for controlling a switch and digital buffers of the mixing driver of FIG. 8, as well as the effective modulation signal clock waveforms in time domain. In particular, FIG. 9 shows, as an example, a multi-level clock scheme with modulation signals GDA, GDB, a control signal for switch S0, an enable signal of digital buffers DBA, DBB, as well as the effective modulation signal Effective_GDA supplied to the upper trace of the pixel, and the effective modulation signal Effective_GDB supplied to the lower trace of the pixel in time domain resulting from this multi-level clock scheme.

The modulation signals GDA, GDB at the input of the mixing driver change from ground to $V_{DD}$ periodically, and the two-modulation signals GDA, GDB have a phase shift of 180 degree with respect to each other.

In a first phase T1, the first modulation signal GDA and the second modulation signal GDB are at GND. Further, the switch S0 is on and the digital buffers DBA, DBB are disabled. While the switch S0 is on, the digital buffers DBA, DBB are disabled to create high impedance at the output of the buffers DBA, DBB, and thus the charge on lower trace, which was charged to $V_{DD}$, is passively redistributed to the upper trace that was discharged to GND. Since the number of unit pixels on both traces is very large, the total capacity $C_{total}$ of the two traces is the same, therefore, half of the charged voltages are passively transferred to the low voltage side without consuming power. Therefore, a voltage with an amplitude of $V_{DD}/2$ establishes at the upper trace of the pixel array and a voltage with an amplitude of GND establishes at the lower trace of the pixel array. In a second phase T2, the first modulation signal GDA is driven high ($V_{DD}$) and the second modulation signal GDB remains at GND. Further, the switch S0 is off and the digital buffers DBA, DBB are enabled. Thus, a voltage with an amplitude of $V_{DD}$ establishes at the upper trace of the pixel array and a voltage with an amplitude of GND establishes at the lower trace of the pixel array. In a third phase T3, the first modulation signal GDA and the second modulation signal GDB are at GND. Further, the switch S0 is on and the digital buffers DBA, DBB are disabled. The voltage that is charged by the upper trace is passively redistributed to the lower trace. Therefore, a voltage with an amplitude of $V_{DD}/2$ establishes at the upper trace of the pixel array and a voltage with an amplitude of $V_{DD}/2$ establishes at the lower trace of the pixel array. In a fourth phase T4, the first modulation signal GDA remains at GND and the second modulation signal GDB is driven high ($V_{DD}$). Further, the switch S0 is off and the digital buffers DBA, DBB are enabled. Therefore, a voltage with an amplitude of GND establishes at the upper trace of the pixel array and a voltage with an amplitude of $V_{DD}$ establishes at the lower trace of the pixel array.

The steps T1 to T4 are repeated so that the resulting effective modulation signal of the upper trace/lower trace results is a two-step function as shown in FIG. 9.

As shown in FIG. 9, the effective modulation signal Effective_GDA that establishes on the of the upper trace of pixel units, and the effective modulation signal Effective_GDB that establishes on the of the lower trace of pixel units have two steps from GND to $V_{DD}$ (GND to $V_{DD}/2$, $V_{DD}/2$ to $V_{DD}$) and the upper trace and the lower trace have a 180 degree phase difference with respect to each other.

In the step from the fourth phase T4 to the first phase T1 (first passive charging phase), i.e. from GND to $V_{DD}/2$ (effective upper trace modulation signal), the power consumption of this step is $P1=0$.

In the step from the first phase T1 to the second phase T2 (second passive charging phase), i.e. from $V_{DD}/2$ to $V_{DD}$, the power consumption of this step is $P2=V_{DD} \times C_L \times 0.5 V_{DD} \times f = 0.5 \times C_{total} \times V_{DD}^2 \times f$.

Therefore, the total average power consumption is $P_{total}=P1+P2=0.5 \times C_{total} \times V_{DD}^2 \times f$.

Compared to the total average power consumption of the conventional method that is shown in FIG. 2 the total average power consumption saved by the third embodiment is:

$P_{save}=0.5 \times C_{total} \times V_{DD}^2 \times f$.

That 50% power is saved compared to the conventional method.

FIGS. 7 and 8 described above present a passive two-level mixing clock scheme. However, the disclosure is not restricted to a passive two-level mixing clock scheme, but with the same principles it is also possible to provide a multi-level mixing clock scheme with more than two levels.

All units and entities described in this specification and claimed in the appended claims can, if not stated otherwise, be implemented as integrated circuit logic, for example on a chip, and functionality provided by such units and entities can, if not stated otherwise, be implemented by software.

Insofar as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to drive a unit pixel (UP1, ..., UPN) for a time of flight camera according to a multi-level mixing clock scheme.

(2) The electronic device of (1), wherein the unit pixel (UP1) comprises a first trace (C1, C2) and a second trace (C3, C4) and wherein the multi-level mixing scheme comprises supplying an effective first trace modulation signal (Effective_GDA) to the first trace (C1, C2) of the unit pixel (UP1) and supplying an effective second trace modulation signal (Effective_GDB) to the second trace (C3, C4) of the unit pixel (UP1).

(3) The electronic device of (1), wherein the multi-level mixing clock scheme is an N-level mixing clock scheme, wherein the effective modulation signals (Effective_GDA, Effective_GDB) have N+1 voltage levels, where N is an integer number greater than 1.

(4) The electronic device of (3), wherein in the N-level mixing clock scheme the N+1 voltage levels of the effective modulation signals (Effective_GDA, Effective_GDB) define N voltage steps.

(5) The electronic device of anyone of (2) to (4), wherein the multi-level mixing clock scheme is a two-level mixing clock scheme, wherein the effective modulation signals (Effective_GDA, Effective_GDB) provides three voltage levels (GND, $V_{DD}/2$, $V_{DD}$).

(6) The electronic device of anyone of (1) to (5), wherein the multi-level mixing scheme is an active multi-level mixing scheme.

(7) The electronic device of (6), wherein the active multi-level mixing scheme comprises generating an effective first trace modulation signal (Effective_GDA) and an effective second trace modulation signal (Effective_GDB) from predefined voltage levels ($V_{DD}$, $V_{DD} \times (N-1)/N$, ..., $V_{DD} \times 1/N$, GND).

(8) The electronic device of (6) or (7), wherein the circuitry comprises switches (SA1, ..., SAN+1, SB1, ..., SBN+1) which are driven according to the multi-level mixing scheme to generate the effective first trace modulation signal (Effective_GDA) and the effective second trace modulation signal (Effective_GDB).

(9) The electronic device of anyone of (6) to (8), wherein the voltage levels ($V_{DD}$, $V_{DD} \times (N-1)/N$, ..., $V_{DD} \times 1/N$, GND) are provided by analog buffers (BA1, BA1, BB1, BB2; BA1, ..., BAN, BB1, ..., BBN) to the unit pixel (UP1, ... UPN).

(10) The electronic device of anyone of (1) to (5), wherein the multi-level mixing scheme is a passive multi-level mixing scheme.

(11) The electronic device of (10), wherein the passive multi-level mixing scheme comprises passively redistributing charge between a first trace (C1, C2) and a second trace (C3, C4) of the unit pixel (UP1, ..., UPN) to generate the effective first trace modulation signal (Effective_GDA) and the effective second trace modulation signal (Effective_GDB).

(12) The electronic device of (10) or (11), wherein the circuitry comprises a switch (S0) that is configured to connect a first trace (C1, C2) of the unit pixel (UP1) with a second trace (C3, C4) of the unit pixel for passively redistributing charge between the first trace (C1, C2) and the second trace (C3, C4) of the unit pixel (UP1).

(13) The electronic device of anyone of (10) to (12), wherein the circuitry comprises a first digital buffer (DBA) for driving a first trace of the unit pixel (UP1, ..., UPN) and a second digital buffer (DBB) for driving a second trace of the unit pixel (UP1, ..., UPN), and wherein to the first buffer (DBA) a first trace modulation signal (GDA) is supplied and wherein to the second buffer (DBB) a second trace modulation signal (GDB) is supplied.

(14) The electronic device of (13), wherein the first digital buffer (DBA) and the second digital buffer (DBB) are enabled/disabled according to the multi-level mixing scheme to generate the effective first trace modulation signal (Effective_GDA) and the effective second trace modulation signal (Effective_GDB).

(15) A time-of-flight system comprising the circuitry of claim 1, a light source (2) and an image sensor (6).

(16) A method, comprising driving a unit pixel (UP1, ..., UPN) for a time of flight camera according to a multi-level mixing clock scheme.

(17) A computer program, comprising instructions, the instructions when executed on a processor controlling a driver of a unit pixel (UP1, ..., UPN) for a time of flight camera according to a multi-level mixing clock scheme.

(18) A non-transitory computer-readable recording medium that stores therein a computer program product, which, when executed by a processor, causes the method according to (15) to be performed.

The invention claimed is:

1. An electronic device configured to drive a unit pixel for a time of flight camera in response to a multi-level mixing clock circuit;
wherein the multi-level mixing clock circuit includes at least two input voltage terminals and at least one switch between at least one of the at least two input voltage terminals and the unit pixel;
wherein the at least one switch is controlled to supply an effective first trace modulation signal to a first trace of the unit pixel and to supply an effective second trace modulation signal to a second trace of the unit pixel;
wherein the first trace of the unit pixel and the second trace of the unit pixel each include respective capacitive storage elements;
wherein the multi-level mixing clock circuit is an N-level mixing clock circuit; and
wherein the effective first trace modulation signal and the effective second trace modulation signal have N+1 voltage levels, where N is an integer number greater than 1.

2. The electronic device of claim 1, wherein in the N-level mixing clock circuit the N+1 voltage levels of the effective first trace modulation signal and the effective second trace modulation signal define N voltage steps.

3. The electronic device of claim 1, wherein the multi-level mixing clock circuit is a two-level mixing clock circuit, wherein the effective first trace modulation signal and the effective second trace modulation signal provides three voltage levels.

4. The electronic device of claim 1, wherein the multi-level mixing circuit is an active multi-level mixing circuit.

5. The electronic device of claim 4, wherein the active multi-level mixing circuit comprises generating the effective first trace modulation signal and the effective second trace modulation signal from predefined voltage levels.

6. The electronic device of claim 5, wherein the predefined voltage levels are provided by analog buffers to the unit pixel.

7. The electronic device of claim 4, wherein the at least one switch is controlled in response to the multi-level mixing circuit to generate the effective first trace modulation signal and the effective second trace modulation signal.

8. The electronic device of claim 1, wherein the multi-level mixing circuit is a passive multi-level mixing circuit.

9. The electronic device of claim 8, wherein the passive multi-level mixing circuit comprises passively redistributing charge between the first trace and the second trace of the unit pixel to generate the effective first trace modulation signal and the effective second trace modulation signal.

10. The electronic device of claim 8, wherein the circuitry comprises the at least one switch that is configured to connect the first trace of the unit pixel with the second trace of the unit pixel for passively redistributing charge between the first trace and the second trace of the unit pixel.

11. The electronic device of claim 8, wherein the circuitry comprises a first digital buffer for driving the first trace of the unit pixel and the second digital buffer for driving a second trace of the unit pixel, and wherein to the first digital buffer the effective first trace modulation signal is supplied and wherein to the second digital buffer the effective second trace modulation signal is supplied.

12. The electronic device of claim 11, wherein the first digital buffer and the second digital buffer are enabled/disabled according to the multi-level mixing circuit to generate the effective first trace modulation signal and the effective second trace modulation signal.

13. A time-of-flight system comprising the circuitry of claim 1, a light source and an image sensor.

14. A method of driving a unit pixel for a time of flight camera in response to a multi-level mixing clock circuit wherein at least one switch is controlled to supply an effective first trace modulation signal to a first trace of the unit pixel and to supply an effective second trace modulation signal to a second trace of the unit pixel;

wherein the at least one switch is between at least one of at least two input voltage terminals and the unit pixel;

wherein the first trace of the unit pixel and the second trace of the unit pixel each include respective capacitive storage elements; and wherein the multi-level mixing clock circuit is an N-level mixing clock circuit; and wherein the effective first trace modulation signal and the effective second trace modulation signal have N+1 voltage levels, where N is an integer number greater than 1.

15. A computer program, comprising instructions, the instructions when executed on a processor controlling a driver of a unit pixel for a time of flight camera in response to a multi-level mixing clock circuit wherein the multi-level mixing clock circuit includes at least two input voltage terminals and at least one switch between at least one of the at least two input voltage terminals and the unit pixel;

wherein the at least one switch that is controlled to supply an effective first trace modulation signal to a first trace of the unit pixel and to supply an effective second trace modulation signal to a second trace of the unit pixel;

wherein the first trace of the unit pixel and the second trace of the unit pixel each include respective capacitive storage elements;

wherein the multi-level mixing clock circuit is an N-level mixing clock circuit; and wherein the effective first trace modulation signal and the effective second trace modulation signal have N+1 voltage levels, where N is an integer number greater than 1.

* * * * *